Nov. 7, 1939.  S. RUBEN  2,178,970
ELECTROLYTIC CONDENSER
Filed Jan. 8, 1938
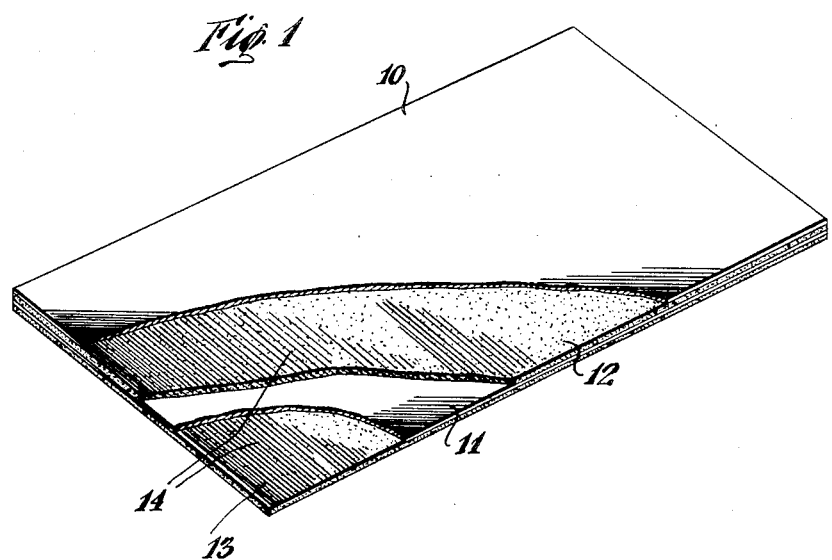
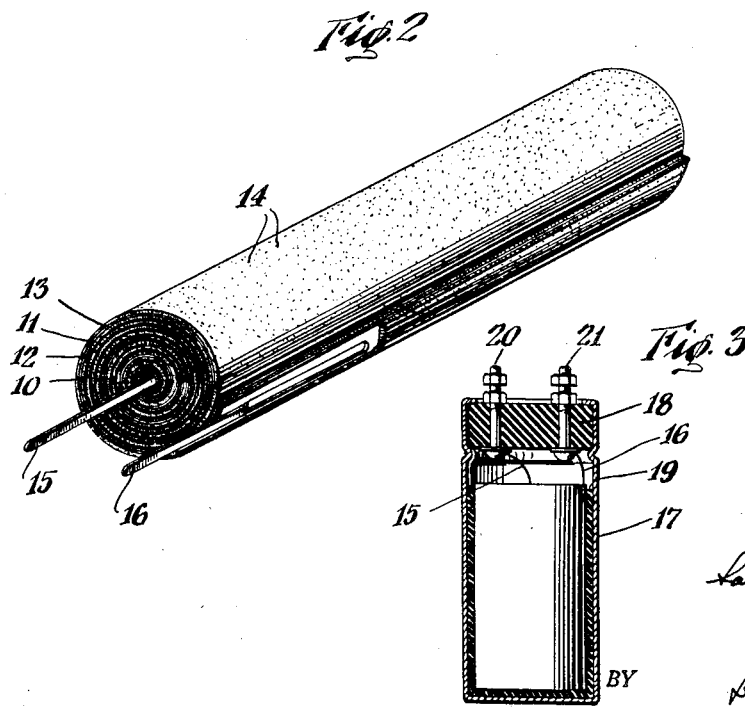
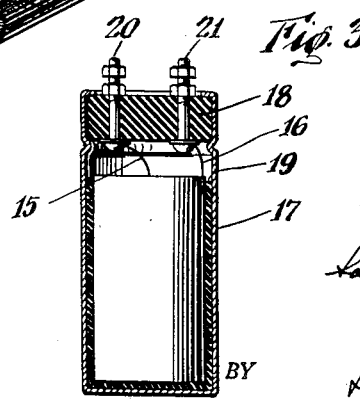
Samuel Ruben
INVENTOR.
BY
ATTORNEYS.

Patented Nov. 7, 1939

2,178,970

UNITED STATES PATENT OFFICE 2,178,970

ELECTROLYTIC CONDENSER

Samuel Ruben, New Rochelle, N. Y.

Application January 8, 1938, Serial No. 183,971

6 Claims. (Cl. 175—315)

This invention relates to electrolytic capacitors and more particularly to capacitors of the dry electrolytic type.

An object of the invention is to produce a spacer element for electrolytic capacitors.

Another object is to provide an electrolyte permeable spacer that will serve to hinder the combination of gases electrolytically produced within the condenser.

A still further object is to combine with a porous fibrous spacer a material which will form a membrane, which membrane can be plasticized and which allows conduction therethrough when in contact with a viscid non-aqueous electroylte.

A specific object of the invention is to provide a spacer element that allows the application of higher voltages than can ordinarily be applied to electrolytic condensers of the prior art and one which is conducive to the distribution of current density uniformly over the entire electrode area.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

In the drawing:

Figure 1 is a perspective view of a flat condenser assembly embodying features of the present invention;

Figure 2 illustrates a condenser in roll form; and

Figure 3 shows a condenser roll enclosed in a container.

One of the problems in producing electrolytic capacitors which will withstand surge voltages above the normal voltages to which the anode in an electrolytic condenser is formed, is the prevention of localization of current at one or more points in the condenser and the prevention of the progressive increase of current at that point due to the negative temperature-resistance coefficient and increase in ionic mobility which is commonly the property of the type of electrolytes used in dry electrolytic capacitors. Such capacitors having the glycoborate type of electrolyte are described in my Patent No. 1,891,207 and those having ammonium lactate electrolyte in my Patent 2,088,928.

Such localization of current as described above results in carbonization of the spacer material, such as paper or gauze, and frequently in the carbonization of the glycol component in the electrolyte itself.

I have previously found that these difficulties could be avoided by the use of a plasticized sheet of regenerated cellulose or "Cellophane", as described in my Patent 1,918,716. However, in the production of "Cellophane" the problem has been to produce material of desired purity at a low cost comparable to that of paper.

I have now found that a spacer can be produced which overcomes the disadvantages mentioned above by using a good grade of paper, preferably hard paper, such as the type now used as a spacer in wax impregnated electrostatic condensers, and passing the paper through a solution of methyl cellulose in water, preferably with the addition of a plasticizing agent such as triethylene glycol to prevent brittleness in the spacer after baking. By these means a membrane material is formed in the paper, which membrane produces results equivalent to that of regenerated sheet cellulose, namely, preventing excessive current localization and acting as a barrier in preventing the combination of gases generated by leakage currents between the electrodes.

According to the preferred method, four grams of flake methyl cellulose is added to 100 c. c. of distilled water, the mixture being stirred and heated to 90° C. and maintained at this temperature until the methyl cellulose is completely dissolved or dispersed in the water forming a gelatinous material. After this, 0.8 gram of triethylene glycol is preferably added. This glycol serves to make the film more flexible and assists in lowering the resistance of the spacer when in contact with the condenser electrolyte.

The paper is thereafter passed through a container of the mixture thus formed and then between a pair of cooperating rubber rollers which squeeze off the excess of the mixture, after which the paper is led through a drying oven maintained at about 120° C. The particular oven temperature used, however, may vary somewhat with the speed at which the paper is passed through the mixture.

This spacer can then be used alone or in combination with a porous paper spacer, the latter being used in order to increase the quantity of electrolyte held between the electrodes and to facilitate impregnation.

The single or laminated spacer may then be interleaved or wound tightly between two electrodes of aluminum foil or other film-forming material, at least one of which is film-formed to provide a dielectric layer. The condenser thus formed can then be impregnated with an electrolyte of the type described in any of my patents previously referred to as well as with other types of electrolytes.

If desired, the electrolyte can be embodied with or added to the methyl cellulose so as to produce a spacer and electrolyte at the same time. The plasticized methyl cellulose solution, according to this method, is preferably mixed with a glycoborate electrolyte made by combining 200 grams ethylene glycol, 190 grams boric acid and 42 c. c. of 28% ammonia solution and heating to 150° C. Sufficient methyl cellulose solution is added to give a 5% methyl cellulose content. The entire mixture is then heated to a temperature determined by the specific resistance or electrolyte sparking voltage desired as determined by the application to which capacitor is to be put. The final resistivity or sparking voltage can also be controlled by varying the baking or drying temperature in the oven through which the impregnated paper is passed.

After the paper is heated it may then be assembled with the electrodes as before. In all cases the unit should be wound as tightly as possible.

Where the electrolyte is embodied in the spacer no further treatment is required after winding. Where the electrolyte is not embodied in the spacer, however, the wound unit must be impregnated with electrolyte by any of the well-known means of impregnation, such as by centrifugal impregnation or by the proper application of heat and low pressure during immersion.

Referring to the drawing, Figure 1 illustrates a flat assembly of treated sheets 12 and 13 containing methyl cellulose composition 14 interleaved with electrode foils 10 and 11. Both the sheets 12 and 13 may have previously been impregnated with the methyl cellulose solution and electrolyte combined as previously described or only with the methyl cellulose solution, in which case further impregnation with electrolyte is necessary before or after assembly.

After assembling the electrodes and spacers it is generally preferred that they be wound together into a roll as illustrated in Figure 2. Spacers 12 and 13 will separate the electrodes 10 and 11 and a conductive path will be provided between the electrodes by the electrolyte with which the sheets 12 and 13 have been impregnated either along with the methyl cellulose or afterward, as already described. Suitable terminal conductors 15 and 16 are provided on the two electrodes to provide for terminal connections.

In a commercial embodiment of the invention, it is generally preferred that the condenser roll illustrated in Figure 2 be inserted in a suitable container, such as a metal can 17 shown in Figure 3. The can 17 may preferably be lined with a layer of insulating material 19 and provided with a cover 18 of insulating material through which the pair of condenser terminals 20 and 21 extend, these terminals being connected respectively to terminal conductors 15 and 16 connected to the two condenser electrodes.

In my previously filed co-pending application Serial No. 138,614, filed April 23, 1937, I describe a viscous electrolyte for electrolytic capacitors containing methyl cellulose and a solvent therefor. I also describe how this may be applied to paper and other spacers to form a conductive electrolyte-spacer combination. The present invention, which comprises an improvement over my prior case, contemplates a novel spacer in which the methyl cellulose composition, instead of being viscous in nature, is dried into the spacer to form a sizing or membrane therein.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A spacer for dry electrolytic capacitors comprising a layer of fibrous material sized with a plasticized, conductive, flexible, non-viscous methyl cellulose composition, said methyl cellulose composition comprising a membrane in said fibrous layer.

2. A spacer for dry electrolytic capacitors comprising a sheet of fibrous cellulose material having formed therewith a membrane of a methyl cellulose composition.

3. A spacer for dry electrolytic capacitors comprising a sheet of paper sized with a methyl cellulose composition membrane.

4. A spacer for dry electrolytic capacitors comprising a sheet of paper sized with methyl cellulose forming a membrane therein.

5. A spacer for dry electrolytic capacitors comprising a sheet of paper sized with a plasticized, conductive, flexible, non-viscous methyl cellulose composition membrane.

6. A spacer for dry electrolytic capacitors comprising a sheet of paper sized with a plasticized, conductive, flexible, non-viscous methyl cellulose composition membrane, said composition being adapted to maintain a current blocking film on electrodes of film-forming metal when used as a spacer therefor in an electrolytic condenser.

SAMUEL RUBEN.